United States Patent [19]

Delaplaine

[11] Patent Number: 5,595,104
[45] Date of Patent: Jan. 21, 1997

[54] WINE BOTTLE AERATOR

[76] Inventor: Robert W. Delaplaine, 3585 Tripp Rd., Woodside, Calif. 94062

[21] Appl. No.: 685,324

[22] Filed: Jul. 23, 1996

[51] Int. Cl.[6] .................................. B01F 3/04; C12H 1/00
[52] U.S. Cl. ........................ 99/323.1; 261/30; 261/124
[58] Field of Search ............................. 99/323.1, 323.2, 99/323.3, 275, 277.1, 277.2, 278, 276, 277; 261/30, 124

[56] References Cited

U.S. PATENT DOCUMENTS

| | | | |
|---|---|---|---|
| 4,494,452 | 1/1985 | Barzso | 99/323.1 |
| 4,526,730 | 7/1985 | Cochran | 261/124 |
| 4,785,724 | 11/1988 | Vassallo | 99/323.1 |
| 5,329,975 | 7/1994 | Heitel | 99/323.1 |

*Primary Examiner*—Robert W. Jenkins
*Attorney, Agent, or Firm*—The Kline Law Firm

[57] ABSTRACT

A wine bottle aerator that includes a power control box, a stopper means, a submersion rod, and an aeration element. The aerator is affixed in a wine bottle, or any bottle desired by a user, by the stopper. The stopper includes vents to allow air flow from the interior of the subject bottle into the atmosphere. In use, the aerator is used to aerate a bottle of wine as follows: The aerator is fitted into the opening of the subject bottle. The submersion rod extends the aeration element to a position near the bottom of the bottle, so that it is completely submerged. When the aerator is activated, the pump draws air in through the air inlet into the pump. The pumping action then forces the air out of the pump through the air outlet and into the submersion rod. The air flows through the submersion rod and into the aeration element. The air then flows outward into the wine through the air holes in the aeration element. Pressure is not increased to a dangerous level in the interior of the bottle due to the vents.

6 Claims, 2 Drawing Sheets

WINE BOTTLE AERATOR

FIELD OF THE INVENTION

The present invention relates generally to a means of aeration, and more particularly is a device to actively introduce air into a wine bottle to aid in the "breathing" process.

BACKGROUND OF THE INVENTION

It has long been recognized that aeration of a bottle of wine improves the taste of the wine. Generally, the wine is decanted for an extended period so that the wine is able to "breath", and become aerated. Because the period of time required for effective treatment of the wine is quite long, there has been a good deal of effort in the prior art to create means to accelerate the process.

One such device is the "Aeration of Liquids" of Wettern, U.S. Pat. No. 5,154,112. This device uses a hand pump in a framework that is attached to a wine bottle. The pump is then operated to force air into the wine bottle.

An automated system for aerating wine is the "Apparatus for Aerating Bottled Wine" of Vassallo, U.S. Pat. No. 4,785,724. This device is rather large and somewhat cumbersome, but does use an electric pump to force air into the wine.

A more streamlined and mobile pump means it the "Wine Aerator" of Barzso. This device includes a housing that rests on the shoulders of a wine bottle. This is done to create an air gap so that pressure does not build in the wine bottle. However, there is no means of securing the device in the bottle, and it is therefore not stable.

OBJECTS, SUMMARY, AND ADVANTAGES OF THE INVENTION

Accordingly, it is an object of the present invention to provide an aeration device that can be safely secured in the mouth of a wine bottle.

It is a further object of the present invention to provide an accelerated means of aerating a bottle of wine.

In summary, the present invention is a wine bottle aerator. The aerator comprises a power control box, a stopper means, a submersion rod, and an aeration element. The aerator is affixed in a wine bottle, or any bottle desired by a user, by the stopper means. The stopper means includes a venting means to allow air flow from the interior of the subject bottle into the atmosphere. In the preferred embodiment, the venting means is a series of longitudinal grooves. In use, the aerator is used to aerate a bottle of wine as follows: The aerator is fitted into the opening of the subject bottle. The submersion rod extends the aeration element to a position near the bottom of the bottle, so that it is completely submerged. When the aerator is activated, the pump draws air in through the air inlet into the pump. The pumping action then forces the air out of the pump through the air outlet and into the submersion rod. The air flows through the submersion rod and into the aeration element. The air then flows outward into the wine through the air holes in the aeration element. Pressure is not increased to a dangerous level in the interior of the bottle due to the venting means.

An advantage of the present invention is that a bottle of wine can be rapidly aerated.

Another advantage of the present invention is that the pump is electrically powered.

A still further advantage of the present invention is that it can be securely affixed to the mouth of the wine bottle, thereby making it stably positioned even during operation.

These and other objects and advantages of the present invention will become apparent to those skilled in the art in view of the description of the best presently known mode of carrying out the invention as described herein and as illustrated in the drawings.

BEST MODE OF CARRYING OUT THE INVENTION

Figure 1:
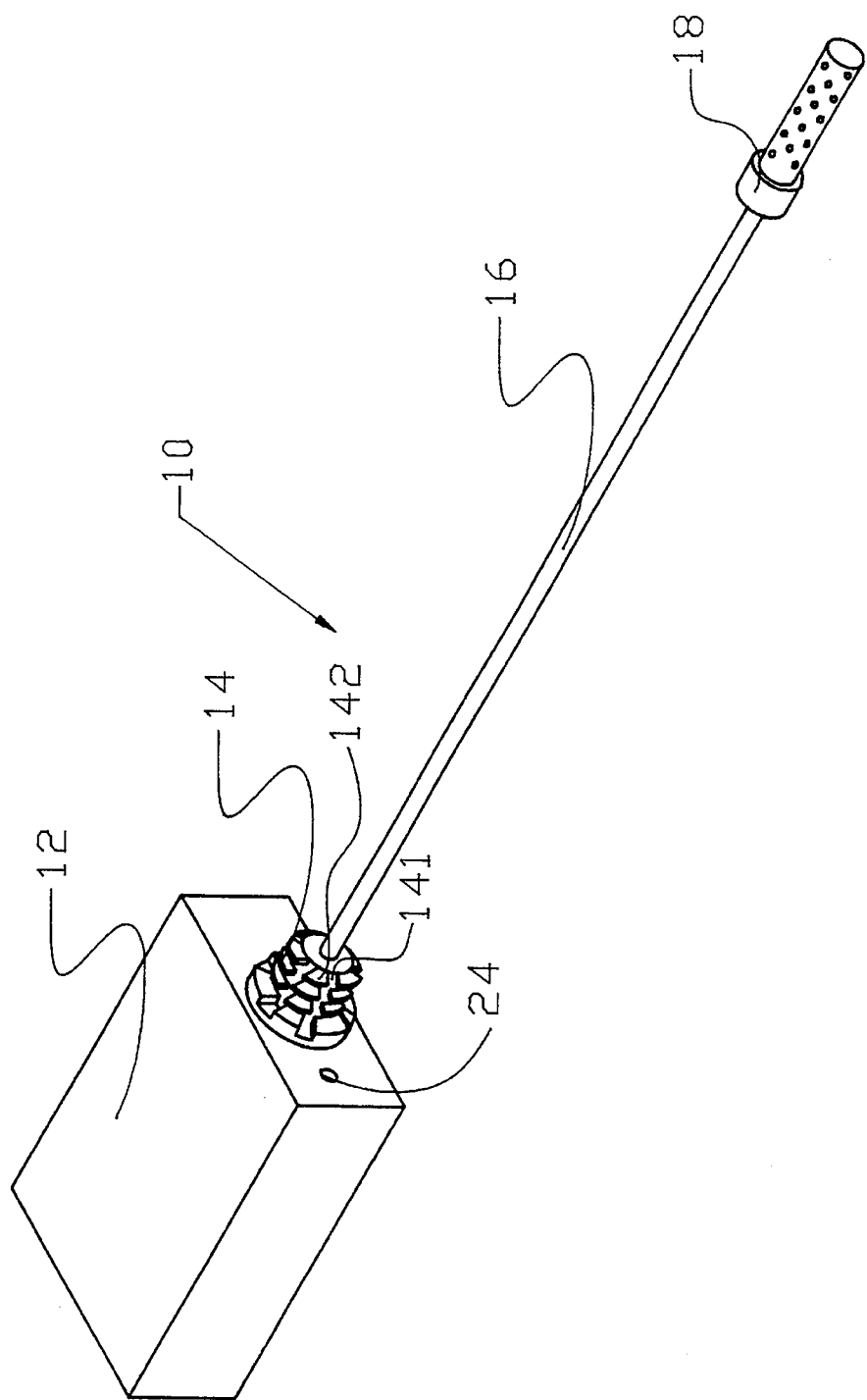
FIG. 1 is a perspective view of the wine bottle aerator of the present invention.
Figure 2:
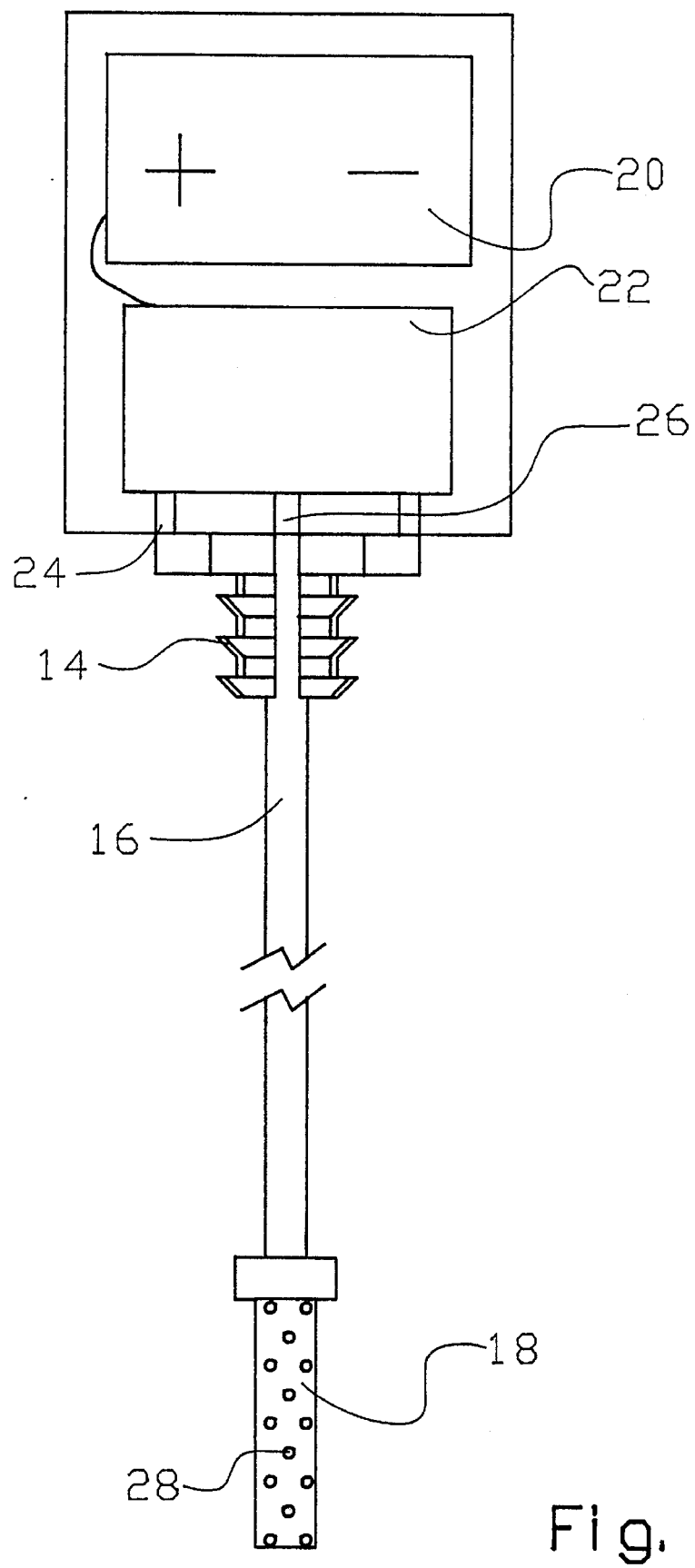
FIG. 2 is a cross section view of the aerator.

The present invention is a wine bottle aerator 10. The aerator 10 comprises a power control box 12, a stopper means 14, a submersion rod 16, and an aeration element 18.

The power control box 12 includes a power supply means 20. In the preferred embodiment, the power supply means 20 will be a battery, or a plurality of batteries. The batteries drive an air pump 22. In the preferred embodiment, the air pump 22 is a small electrical bellows pump. The air pump 22 draws air in through air inlet 24, and pumps air out through an outlet 26 into the submersion rod 16.

The submersion rod 16 passes through a center of the stopper means 14. The length of the submersion rod is chosen so as to deliver the air to a central or lower portion of the subject bottle. The aeration element 18 is fixed to a distal end of the submersion rod 16.

The aerator 10 is affixed in a wine bottle, or any bottle desired by a user, by the stopper means 14. The stopper means includes a venting means 141 to allow air flow from the interior of the subject bottle into the atmosphere. In the preferred embodiment, the venting means 141 is a series of longitudinal grooves.

The stopper means 14 may also include a securing means 142 to affix the aerator 10 in the mouth of the bottle. The securing means 142 is a series of flexible or semiflexible ribs 142. Alternatively, the stopper 14 can simply be formed from a deformable material.

In use, the aerator 10 is used to aerate a bottle of wine as follows: The aerator 10 is fitted into the opening of the subject bottle. The submersion rod 16 extends the aeration element 18 to a position near the bottom of the bottle, so that it is completely submerged. The aerator is affixed in place on the bottle by the stopper means 14.

When the aerator 10 is activated, the pump 22 draws air in through the air inlet 24 into the pump 22. The pumping action then forces the air out of the pump 22 through the air outlet 26 and into the submersion rod 16. The air flows through the submersion rod 16 and into the aeration element 18. The air then flows outward into the wine through the air holes 28 in the aeration element 18. Pressure is not increased to a dangerous level in the interior of the bottle due to the venting means 141.

In this manner, air is forced to percolate through the wine, thereby accelerating the "breathing" process. This accelerated breathing process enables the wine to reach it optimal "drinkability" far more quickly than would the wine if simply decanted or allowed to let stand.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

I claim:

1. An aerator for a bottle comprising:

a power control box, a stopper means comprising venting means, a submersion rod, and an aeration element; wherein said power control box includes a power supply means that drives an air pump to draw air in through an air inlet and pump air out through an air outlet into said submersion rod then out through said aeration element, and said stopper means is seated securely in a mouth of said bottle, thereby stably anchoring said aerator, said venting means of said stopper means allows air to vent from an interior of said bottle such that air pressure in said interior does not exceed a safe level.

2. The aerator of claim 1 wherein:

said venting means is at least one longitudinal groove in said stopper means.

3. The aerator of claim 1 wherein:

said stopper means includes a securing means to affix said aerator in said mouth of said bottle.

4. The aerator of claim 3 wherein:

said securing means is a series of flexible ribs.

5. The aerator of claim 1 wherein:

said power supply means is a battery.

6. The aerator of claim 1 wherein:

said air pump is an electrical bellows pump.

* * * * *